United States Patent [19]

Lowrey, Jr. et al.

[11] 3,986,774

[45] Oct. 19, 1976

[54] GAUGING SURFACES BY REMOTELY TRACKING MULTIPLE IMAGES

[75] Inventors: Orvey P. Lowrey, Jr., Madison; Frederick P. Molden, Manchester; James P. Waters, Rockville, all of Conn.

[73] Assignee: United Technologies Corporation, Hartford, Conn.

[22] Filed: May 8, 1975

[21] Appl. No.: 575,682

[52] U.S. Cl. ........................... 356/3; 356/4; 356/167
[51] Int. Cl.² ........................... G01B 11/24
[58] Field of Search ............ 356/1, 2, 3, 4, 120, 356/156, 163, 167, 172

[56] References Cited
UNITED STATES PATENTS

| | | | |
|---|---|---|---|
| 3,655,990 | 4/1972 | Nordquist | 356/167 |
| 3,858,983 | 1/1975 | Foster et al. | 356/156 |
| 3,909,131 | 9/1975 | Waters | 356/3 |

Primary Examiner—John K. Corbin
Assistant Examiner—Richard A. Rosenberger
Attorney, Agent, or Firm—Anthony J. Criso

[57] ABSTRACT

A system for measuring the surface contour of an object by tracking the image of a spot of radiation focused on the surface is disclosed. The radiation spot is imaged on a plurality of suitable detectors which are remote to the surface and connected electrically in parallel. Continuous data on the contour of the surface is provided even though irregularities on the surface interfere with the scattered radiation propagating along the line of sight to one of the detectors. This highly accurate system is servocontrolled and can be automated for recording, storing or displaying data.

11 Claims, 5 Drawing Figures

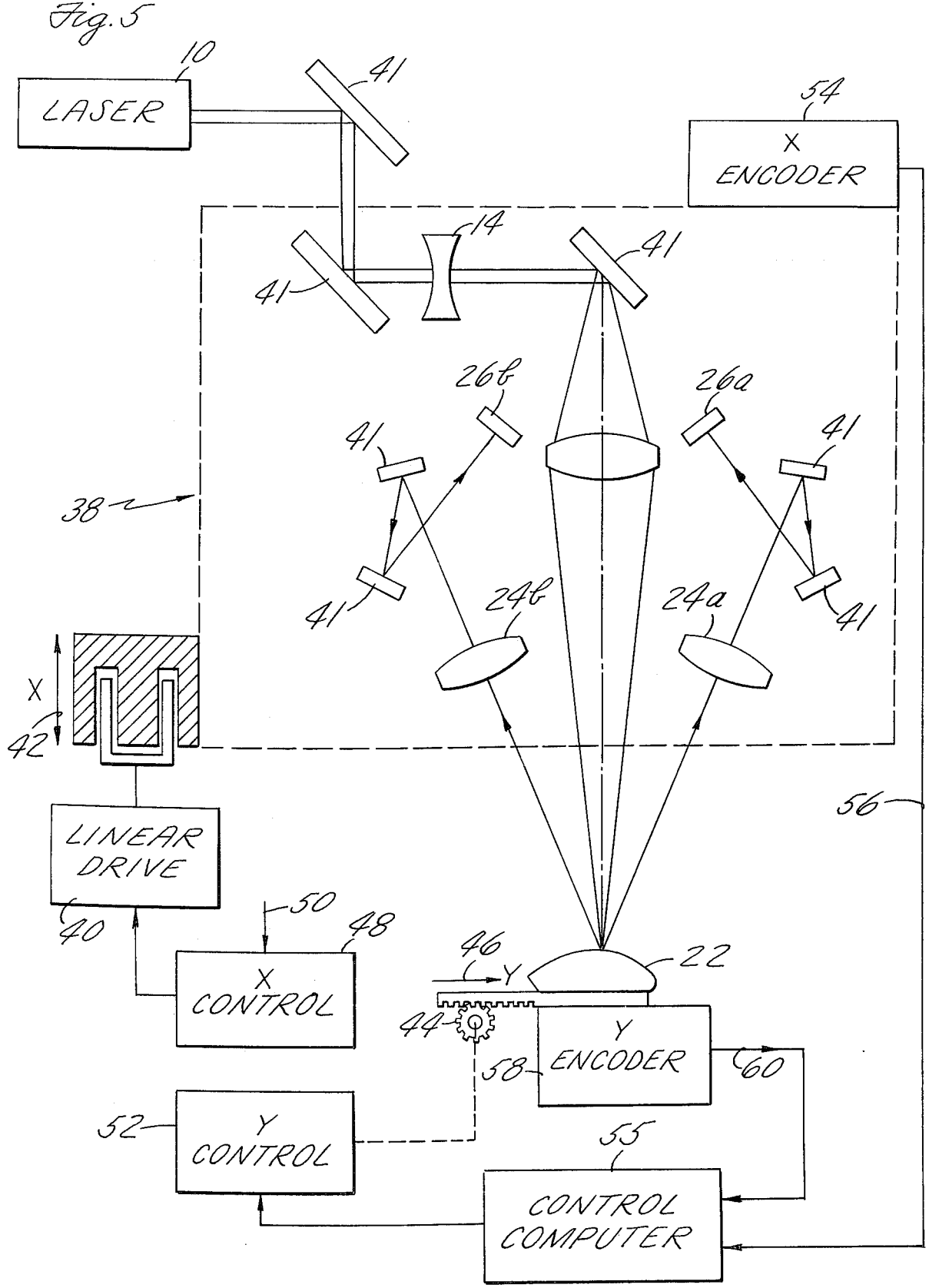

GAUGING SURFACES BY REMOTELY TRACKING MULTIPLE IMAGES

BACKGROUND OF THE INVENTION

1. Field of the Invention

The present invention relates to surface gauging and more particularly to apparatus for measuring the contour of a scattering surface with focused electromagnetic radiation.

2. Description of the Prior Art

The manufacture of many precision articles such as elements of instrumentation and various shapes for gas turbine engines requires the close control of and the ability to determine the contour of various surfaces on such articles. The conventional gauging techniques applicable to the problem have been surveyed and for the most part noncontact optical gauging systems have been found the most appropriate to provide the relatively stringent requirements for such articles. U.S. Pat. No. 3,671,126 entitled Noncontacting Optical Probe is simply not accurate enough for some applications. One very good system which has been found successful in surface gauging is described by J. P. Waters in U.S. Pat. No. (442,269), entitled Surface Gauging By Remote Image Tracking, filed on Feb. 12, 1974 and held together with the present invention by a common assignee. The patent teaches a unique technique for remotely tracking a spot of radiation which is focused on the surface to be gauged. The technique is extremely accurate and allows contour mapping of highly irregular surfaces in a relatively short period of time. One of the shortcomings of such a system is the shadowing effect which is encountered with certain kinds of surface contours. For example, in gauging a curved surface having fin-like projections, these surface irregularities can interfere with the line of sight between the detector and the spot on the surface from which the incident radiation is scattered. Thus, various points on the surface being measured adjacent to raised or sunken areas are shadowed from the detector and no data is possible for such points with the teaching provided in the above described application.

SUMMARY OF THE INVENTION

A primary object of the present invention is to provide a contour measurement of a surface which is uneven with a remotely tracking optical system.

The present invention is predicated on the recognition that when scanning a surface with a spot of electromagnetic radiation and the radiation scattered by the surface is being monitored by a detector, variations in the surface contour sometimes shadow the detector. However, the continuity of scattered radiation reaching the detection means can be maintained with a plurality of individual detectors suitably located with respect to the surface so that at all times at least one of these detectors has a line of sight to the spot of radiation on the surface.

According to the present invention, a source of electromagnetic radiation is directed onto the surface to be gauged and a plurality of optical sensing elements is located at positions which are precise with respect to the surface and the elements in a feedback loop to provide continuous controlled system which produces information describing the contour of the surface on the object being gauged.

A primary feature of the present invention is the use of multiple detectors, each having discrete light sensitive surface areas wherein corresponding areas from each detector are connected in electrical parallel. A relatively rough surface such as is typical of a cast metal object is readily gauged. Also, each detector circuit can be set up with magnification which is different from the others to produce data having accuracies ranging from coarse to fine.

An advantage of the present invention is the increase in the strength of the detection signal which results from the use of multiple detectors; the detection signal is usually enhanced for either flat or curved surface contours. The invention allows the taking of data over the entire surface of an object even though the object includes discontinuities in surface elevation. The use of multiple detectors eliminates the absence of data on surface variation otherwise caused by shadowing of the scattered radiation and permits the recording of data at locations immediately adjacent to protrusions extending vertically from the surface. Another advantage is the increased angle of acceptance possible with the present invention which in some applications is up to eighty degrees to either side of the axis of propagation of the source radiation incident on the object.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 5 is a simplified sketch showing the major components in a practical assembly.

DESCRIPTION OF THE PREFERRED EMBODIMENT

Figure 1:
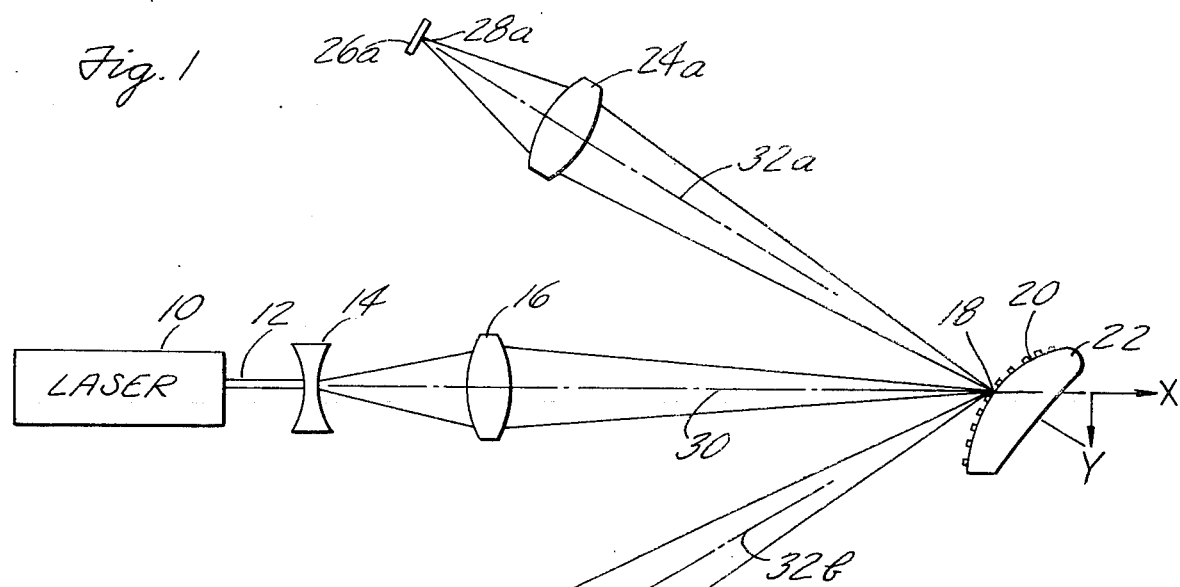
FIG. 1 is a simplified schematic sketch showing the optical elements used in the operation of the present invention.

A simple apparatus used in the practice of the present invention is shown in FIG. 1. A source 10 of electromagnetic radiation such as a laser provides a source beam 12 which is expanded with a negative lens 14 and then focused with a positive lens 16 to a focused spot 18 on the surface 20 of an object 22. Detection lenses 24a and 24b suitably positioned with respect to the radiation incident upon the object as will be discussed further hereinafter, collect and focus scattered radiation onto detectors 26a and 26b as an imaged spot 28a and 28b.

The operation of the present invention is based on the precise locating with respect to each other of the radiation source, the detectors and the object to be gauged in accordance with the technique relied on by Waters in U.S. Pat. No. (442,269). The source radiation is directed onto the surface 18 of the contour along an incident axis 30 as shown in FIG. 1. The surface scatters this radiation a portion of which is collected along the detection axes 32a and 32b by the detection lenses to form the imaged spots on their respectively associated detectors. Each detector is a multielement cell having a null position on its surface and is initially aligned with the null on a detection axis. Each detector produces an electronic signal which describes the location of the imaged spot on the surface of the detector indicating whether the imaged spot is to the left of, to the right of or on null. As necessary, the detectors are moved with respect to the surface causing the imaged spots to move toward a reference or null position on the detector and each time an imaged spot returns to the reference the amount of detector movement necessary to cause the result is noted. This detector movement is analytically transformable into a corresponding change in surface contour and the process is essentially repeated although as a practical matter both the object and the detectors can be moving continuously throughout a gauging sequence.

Figure 2:
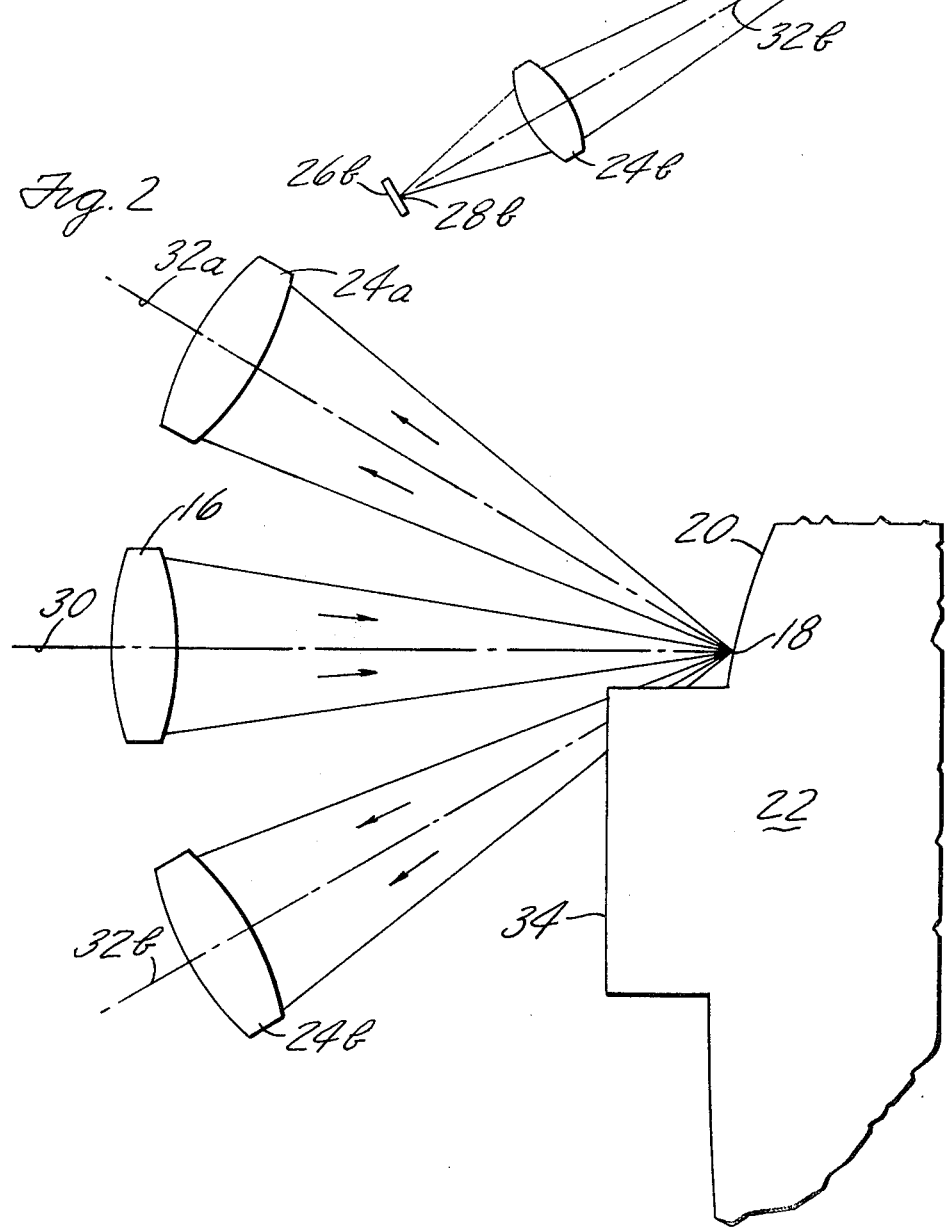
FIG. 2 is a simplified sketch showing the shadowing effect on one detector caused by a platform rising from the surface being gauged.

When a remote tracking system such as the one described in FIG. 1 is used to measure the contour of a surface having an abrupt change in surface contour, various combinations of relative positions between the source of incident radiation, the surface, and the detector incur shadowing effects for which no scattered radiation reaches one of the detectors. A local region of the object 22 having a plateau 34 is enlarged and shown in FIG. 2. The source beam forming the focused spot is symmetric about an incident axis 30 and the surface scatters the incident radiation from the source beam as is discussed hereinafter. The radiation scattered along the detection axis 32b strikes the side of the plateau 34 and is thereby prevented from reaching the detection lens 24b. With a detection system such as is disclosed in the above referenced patent, the plateau shadows the focused spot 18 from the detector lens 24b and no return signal is produced, however, with the additional detection lens 24a and associated circuitry a continuous mapping of the surface 20 right up to the base of the plateau is accomplished.

Figure 3:
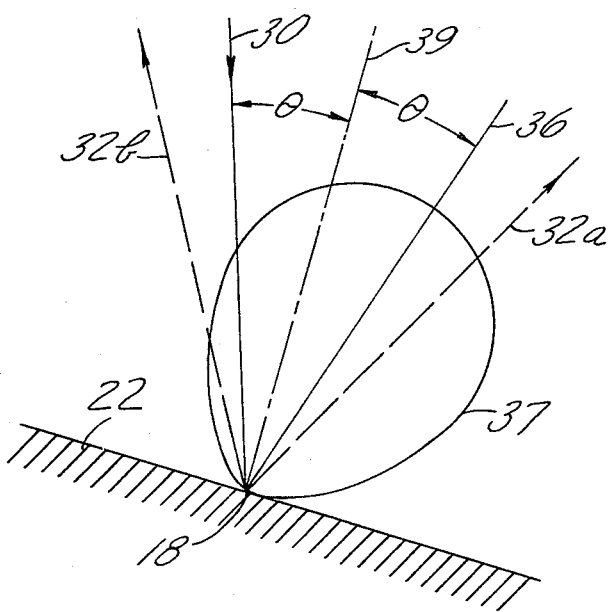
FIG. 3 is an illustration of the intensity profile for optical radiation scattered by a typical rough surface.

FIG. 3 is a simplified plot showing a typical intensity distribution for radiation scattered by the object 22 from the focus spot 18. The radiation is incident upon the surface along the incident axis 30 and the scattered radiation is symmetrical about the specular reflection axis 36. If the magnitude of the angle between a normal 39 to the surface and the incident axis 30 is $\theta$, then the angle between the specular reflection axis 36 and surface normal 39 is also $\theta$. The relative intensity of the radiation scattered in any given direction with respect to the focused spot 18 is represented by a radiation pattern 37. Positioning a detector on either side of the incident axis results in a combined detection signal which is easily discernible even though the surface angles $\theta$ and angle between the surface normal 39 and the incident axis 30 are varied over a wide range. As is apparent from FIG. 3, the total signal strength along the two detection axes is a function of the angle between the two detectors, the angle $\theta$ and the position of the surface normal relative to the incident axis.

Figure 4:
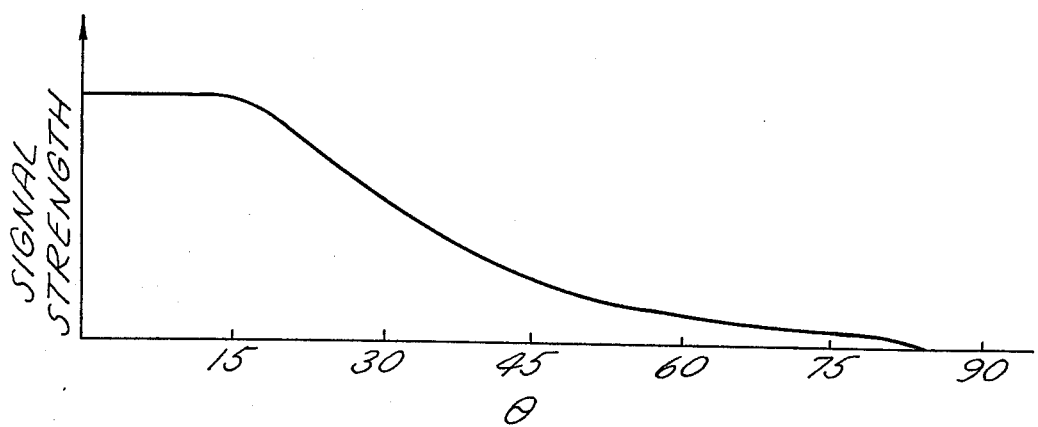
FIG. 4 is a plot of relative signal strength from the detector as a function of the difference between the axis of incidence and the detector axis.

A plot of detector output as a function of the angle $\theta$ for a typical detection system is shown in FIG. 4. Each dectection axis was located thirty degrees from the incident axis 30. The signal strength in normalized units is essentially constant until the value of $\theta$ becomes one half the angle between a detector and the incident axis which for this example is fifteen degrees. Once $\theta$ becomes less than fifteen degrees the signal strength is reduced as shown. When the value of $\theta$ is equal to the angle between a detection axis 32 and the incident axis 30, the strength of the signal is half the original peak intensity; at a value of approximately 80° essentially no useful signal is returned from the surface. The point at which no useful signal can be detected varies with the texture of the surface 22 and the coherence of the radiation source.

As a practical matter the position of each detector is determined by the actual radiation scattering pattern. In a two detector installation, each detector is positioned to be exposed to approximately one half of the peak intensity which is scattered along the specular reflection axis 36. In this geometry the specular reflection axis is midway between the detection axes 32a and 32b for the condition in which the incident beam is normal to the surface and thus the strength of the collective signal from the multiple detectors is constant over a wide range of surface variations. Once the detectors are set the specular reflection axis 36 can vary anywhere between the two detection axis with a maximum decrease of half the signal.

FIG. 5 is a schematized sketch showing the basic system of FIG. 1 with a plurality of folding mirrors 41 in a practical system which requires that the focusing and receiving optical elements be integrated into a compact optics head 38. The entire combination of elements inside the dashed lines is packaged into a single low inertia assembly which is capable of moving as one unit. The series of folding mirrors shown is sometimes necessary to provide a sufficient travel for the reflected energy after it has passed through the collecting lenses to allow this radiation to be focused on the detector. The head responds rapidly to the signals produced at the detectors and keeps the energy reflected from the focused spot on the object at a preselected location on the detector surface. A linear drive actuator 40 drives the head in an $X$ direction 42 and an object positioner 44 drives the object in a $Y$ direction 46. An X position control 48 receives detector signals 50 from the detectors 26a and 26b and provides $X$ direction drive signals to the drive actuator 40. A $Y$ position control 52 provides $Y$ direction drive signals to the object positioner 44 in response to a preprogrammed schedule which can be provided by a control computer 55. An $X$ encoder 54 having an $X$ position signal 56 and a $Y$ encoder 58 having a $Y$ position signal 60 keep track of the linear movements of the optics head 38 and the object 22 respectively. As a practical matter, the position signals 56, 60 are often displayed visually and also feed into the control computer 55 in which the actual dimensions are compared with standard reference dimensions.

A gauging system having multiple detectors can overcome many of the problems caused by shadowing as described above. In addition, the multiple detection circuits can be adjusted to change the sensitivity of that circuit. For example, if the focal length of the detection lens 24b is made longer than the focal lens of the lens 24a a simultaneous fine and coarse mapping of the surface contour is accomplished. Similarly, the angle between any specific dectection axis and the incident axis can be varied to affect sensitivity since the system sensitivity decreases as the magnitude of this angle decreases.

The negative lens shown in FIG. 1 is inserted into the system primarily in those applications in which the source radiation is a collimated beam of relatively small diameter since it aids in reducing the diameter of the focused spot. In other applications, particularly those in which the source 10 is a point source, a negative lens is not used. The diameter of the focused spot can be an important consideration particularly in gauging a surface having a contour which changes rapidly because the contour measurement provided by the system is an average over the area of the focused spot. For some surfaces with a high rate of surface change an accuracy in ten thousandths of an inch is possible with a focused spot diameter in the range of one mil.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A gauging system for determining the contour of the surface of an object comprising:
   means for providing source radiation along an incident axis to the surface of the object;
   means for forming to a first imaged spot the source radiation which is scattered by the surface along a first detection axis;
   detection means responsive to the scattered radiation for determining the position of the first imaged spot with respect to the first detection axis;
   means for forming to a second imaged spot the source radiation which is scattered by the surface along a second detection axis;
   detection means responsive to the scattered radiation for determining the position of the second imaged spot with respect to the second detection axis;
   means for moving the detection means and source radiation with respect to the object to cause the first and second imaged spots to return to their respective detection axes;
   means for moving the object with respect to the incident axis; and
   means for measuring the linear movement of the detection means with respect to the object.

2. The invention according to claim 1 including means for concentrating the source radiation to a spot on the surface.

3. The invention according to claim 1 including means for correlating the linear movement measurements to precise locations on the surface of the object.

4. The invention according to claim 3 including means for converting each linear movement measurements to a corresponding change in contour of the surface.

5. The invention according to claim 4 including means for comparing the change in contour of the surface with a reference contour.

6. The invention according to claim 5 wherein the detection means for determining the position of the first and second imaged spots provide output signals which are connected in electrical parallel.

7. The invention according to claim 6 wherein the means for forming the second imaged spot has a focal length which is greater than the focal length of the means for forming the first imaged spot.

8. The invention according to claim 6 wherein the angle between the second detection and the incident axes is less than the angle between the first detection and incident axes.

9. The invention according to claim 6 wherein the first and the second detection axes are positioned symmetrically about the incident axis.

10. The invention according to claim 9 wherein the included angle formed at the point of intersection by a detection axis and the incident axis is less than eighty degrees.

11. The invention according to claim 10 wherein the source radiation is a visible wavelength.

* * * * *